(12) United States Patent
Biere et al.

(10) Patent No.: US 8,214,382 B1
(45) Date of Patent: Jul. 3, 2012

(54) DATABASE PREDICATE CONSTRAINTS ON STRUCTURED QUERY LANGUAGE STATEMENTS

(75) Inventors: Devon L. Biere, Olathe, KS (US); Carl J. Persson, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 442 days.

(21) Appl. No.: 12/323,456

(22) Filed: Nov. 25, 2008

(51) Int. Cl.
*G06F 17/00* (2006.01)
(52) U.S. Cl. ........................................ 707/761; 707/769
(58) Field of Classification Search .................. 707/761, 707/769
See application file for complete search history.

(56) References Cited

U.S. PATENT DOCUMENTS

| | | | |
|---|---|---|---|
| 6,453,314 B1* | 9/2002 | Chan et al. | 1/1 |
| 7,028,057 B1* | 4/2006 | Vasudevan et al. | 707/695 |
| 2002/0120537 A1* | 8/2002 | Morea et al. | 705/35 |
| 2003/0055814 A1* | 3/2003 | Chen et al. | 707/3 |
| 2010/0088315 A1* | 4/2010 | Netz et al. | 707/737 |

* cited by examiner

*Primary Examiner* — Mohammad Ali
*Assistant Examiner* — John Hocker (57) ABSTRACT

A method of enforcing database predicate constraints on database accesses is provided. The method comprises receiving a database query, parsing the query based on constraints defined in system tables, and examining the query for the existence of a where clause. The method also comprises examining the where clause to determine compliance with the constraints defined in the system tables and executing the query only when the query contains a where clause and the where clause complies with the constraints defined in the system tables. The method also comprises rejecting the query when the query one of does not contain a where clause and does contain a where clause and the where clause does not comply with the constraints defined in the system tables.

17 Claims, 5 Drawing Sheets

DATABASE PREDICATE CONSTRAINTS ON STRUCTURED QUERY LANGUAGE STATEMENTS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Queries are used to retrieve information from specified tables or multiple related tables in databases based on specific criteria. Queries allow a user to specify a description of the desired result set and include a list of columns to be included in the final result. The where clause is optional with queries and is used to restrict the number of table rows returned by a query. It is used to extract only those records that fulfill a specified criterion and filters out all others. In a structured query language (SQL) statement, the where clause specifies that a query should only affect rows that meet the specified criteria. The criteria are expressed in form of predicates. Each predicate in a where clause eliminates rows from the candidate set. An application evaluates the predicate for every row in the subject table and returns the rows that satisfy the predicate. When a where clause is absent from a query, the resulting row set can be extremely large. While use of a where clause may commonly be associated with structured query languages, it may also potentially encompass other languages and syntaxes where the defined function is the same even if the word "where" does not appear in the instruction.

SUMMARY

In an embodiment, a method of enforcing database predicate constraints on database accesses is provided. The method comprises receiving a database query, parsing the query based on constraints defined in system tables, and examining the query for the existence of a where clause. The method also comprises examining the where clause to determine compliance with the constraints defined in the system tables and executing the query only when the query contains a where clause and the where clause complies with the constraints defined in the system tables. The method also comprises rejecting the query when the query one of does not contain a where clause and does contain a where clause and the where clause does not comply with the constraints defined in the system tables.

In another embodiment, a method of modifying database commands using structured query language statements that include the where clause is provided. The method comprises enforcing a first requirement that a where clause is used with queries submitted to a database management system and enforcing a second requirement that a query is further limited by specifying columns of the database table affected by the query. The method also comprises enforcing a third requirement that a query is further limited by specifying one of values and ranges of values and enforcing a fourth requirement that when a query references a first column, the query includes a where clause identifying a second column. The method also comprises executing the query only when the query meets each of the first, second, third, and fourth requirements. The method also comprises rejecting the query when the query does not meet at least one of the first, second, third and fourth requirements.

In another embodiment, a method of enforcing constraints on database accesses is provided. The method comprises receiving a query associated with a user of a database application, determining the classification of the user, and parsing the query to search for the presence of a where clause. The method also comprises consulting constraints defined in system tables to determine constraints applying to data tables included in the query and constraints applying to the classification of the user, wherein the constraints specify that the where clause is included in the query. The method also comprises executing the query only when the query complies with the constraints applying to data tables included in the query and constraints applying to the classification of the user. The method also comprises rejecting the query when not in compliance with the constraints defined in the system tables applying to data tables included in the query and constraints applying to the classification of the user.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Several embodiments of a method for enforcing constraints on queries submitted to databases are disclosed that promote efficient data access practices by requiring the use of the where clause with structured query language (SQL) statements. Enabling a database management system to place constraints on database queries by requiring the where clause may result in significantly reduced consumption of database and database management system resources and faster return of desired query results. Placing constraints on database queries by requiring the use of the where clause with appropriate parameters protects a database from poorly written query statements that heavily tax the processors, memory, and storage devices associated with database servers. Once a query is executed, it may be difficult to stop and roll back. Attempting to stop a query in process and roll it back off a database server risks crashing or corrupting the database. Developers of database applications may build queries without proper delimiters into their applications that may return acceptable results but also overly stress the database and degrade database performance. Developers and users creating queries may not anticipate the consequences of an unconstrained update, delete, or select statement that too widely queries a database, particularly a very large production database. If testing of application code is conducted using a small, unrealistically scaled database, as may often happen to avoid interference with live systems, the performance degradation associated with such unconstrained database access may not be observed until the application is deployed to production. The application may then cause the database to become unavailable for an extended period of time. This may be likened to a denial of service attack, but in this case caused unintentionally by an authorized application.

A query requesting a multiple table join that is not properly constrained with a where clause denoting table columns may result in a Cartesian product generating an excessive amount of data and cause noticeable performance degradation in an enterprise database. Database management systems and associated software tools may provide advice about query construction and may even warn when a query is potentially dangerous but they do not expressly prevent destructive queries from being executed. The destructive potential of a poorly designed query may not therefore be recognized until after the query has been executed and resource cost to the database has already been irreversibly incurred. Terminating the query and then perhaps attempting to roll the query back off the affected database may be more costly and time consuming as even further resources may be required for this remedial action, compounding the problem.

In embodiments of the system, a constraint is defined in the system tables of the database management system. The constraint requires the use of the where clause and appropriate parameters with queries. Constraints may be applied to how the data tables are accessed by entities that may include client devices, users, groups, and job functions. In addition, a new query limiter subcomponent of the parser component of the database management system is created. The new query limiter subcomponent has the functionality to compare queries received to the new constraints in the system tables and determine if the requirements of the constraint are being met given the specifics of the query. The query may be rejected and not permitted to execute if it fails to meet the requirements of the constraint. The database will not be affected by the poorly constructed query as no data cells are accessed by the rejected query. Embodiments of the system are encapsulated in the database management system and in some embodiments cannot be deleted or removed by application developers or users. The system provides continuing protection to the database regardless of the quality of front-end database applications and the experience of database application developers.

Embodiments of the present disclosure provide the database management system more control over how users and applications can submit queries. While the present disclosure may discuss queries that primarily request data, database queries generally refer to any database access and may be any of a write, read, delete, and modify operation. While the system enforces discipline on application developers to create more efficient queries, it is also flexible and configurable for different data stores and application structures. Rule templates and rule structures allow for customization. Privilege levels for submitting queries may be granted by enforcing constraints on users, groups, and client device types as well as data tables. Query constraints are assigned to data tables in a database and to parties that submit queries to the database. When a query is received, after it is parsed for proper syntax, structure, and inclusion of a where clause, the constraints tables for both the data tables involved in the query and the party that submitted the query are consulted. The constraints describe what the where clause in the query is required to state as well as limitations on parameters allowed in the setting of the where clause. The combined constraints applying to the data tables and submitting party provide the guidelines for the construction of the query and the boundaries for how the where clause may be used to be in compliance and receive desired execution of database query.

Figure 1:
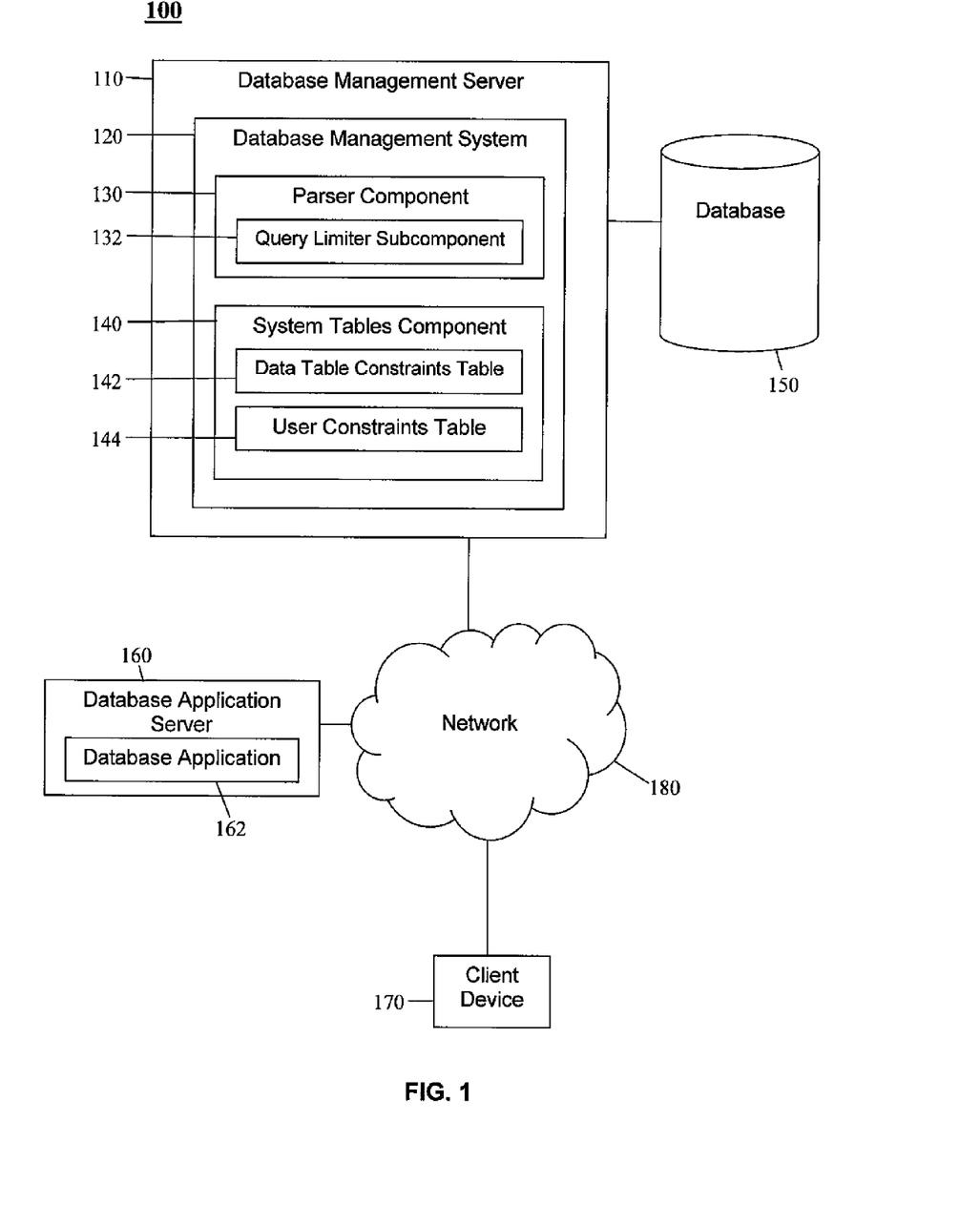
FIG. 1 is a block diagram of a system according to an embodiment of the disclosure.

Turning to FIG. 1, a system 100 of enforcing database predicate constraints on database accesses is provided. The system 100 comprises a database management server 110, a database management system 120, a database 150, a database application server 160, a database application 162, a client device 170, and a network 180.

The database management server 110 may be any general purpose computer system, as discussed in greater detail hereinafter. The database management server 110 may comprise one computer or a plurality of computers, for example, a server farm wherein many server computers cooperate to share a processing load. The database management server 110 may comprise a plurality of computers that are located at different places, for example, to provide geographical diversity and increased service reliability. The database management server 110 executes one or more applications that provide services to the client device 170 including hosting of the database management system 120.

The database management system 120 is computer software designed for the purpose of managing the database 150. The database management system 120 controls the organization, storage, management, and retrieval of data in the database 150. The database management system 120 comprises the parser component 130 that examines the syntax of a database query and analyzes the grammatical structure and sequence of components of the query. The parser component 130 comprises the query limiter subcomponent 132 that examines the database query for the existence and placement of limiting clauses including the where clause. The query limiter subcomponent 132 accesses constraints tables located in the system tables component 140 to determine whether uses of the where clause in database queries are in compliance with the constraints set forth in the constraints tables regarding limitations on how the database 150 may be queried.

The database management system 120 also comprises the system tables component 140 that stores and manages the system tables used by the database management system 120 in accessing and managing the database 150 including the processing of database queries. The system tables component 140 comprises the data table constraints table 142 that stores query constraints that apply to data tables stored in the database 150 including the constraint requiring database queries to include the where clause. Each data table in the database 150 may be assigned one or more constraints that guide the database management system 120 in executing queries that involve the data table. In an embodiment, fields within a data table may have different privilege levels for access by users. The data table constraints table 142 dictates how the where clause may be used with different types of queries for each data table in the database 150. For any query involving a data table stored in the database 150, the data table constraints table 142 will identify what the where clause in the query must specify for the data table and will set limits on what the where clause in the query may specify if the use of parameters are applicable for a query.

The system tables component 140 also comprises the user constraints table 144 that applies to users and client devices 170. Different query constraints may be applied to different users depending on factors such as a user's level of experience, security permissions, and need to submit certain queries. Constraints may be applied to users and client devices 170 by specifying how a particular user or client device 170 may submit a query. Requiring that a where clause be present and constructed with specific parameters for a particular user or client device 170 permits effective enforcement of policy regarding database querying. When two users that have been assigned different levels of query constraints furnish the same correctly constructed query, one user may receive results of the query when it is executed and the other user may receive an error message noting the query was rejected. Query constraints may be placed on users and client devices 170 in the same manner as constraints may be placed on data tables. For a given user, client device 170, or another entity submitting a query, the user constraints table 144 will dictate what limitations apply in terms of what the user or client device 170 might request in a query, what tables they may invoke in a query, and what parameters the user or client device 170 may specify. For example, a junior software developer may be prohibited from furnishing a join query involving two or more data tables without join conditions but a more senior developer may be permitted to execute the same query.

The database 150 is a structured collection of records containing data in data tables. The database 150 stores and makes information available to the database application 162 through the database management system 120 and possibly other server computers that may execute applications unrelated to the system 100.

The database application server 160 may be any general purpose computer system, as discussed in greater detail hereinafter. The database application server 160 may comprise one computer or a plurality of computers, for example a server farm wherein many server computers cooperate to share a processing load. The database application server 160 may comprise a plurality of computers that are located at different places, for example to provide geographical diversity and increased service reliability. The database application server 160 executes one or more applications that provide services to the client device 170 including the database application 162.

The database application 162 executes on the database application server 160 and is the software application that a client device 170 uses to draw data from the database 150 and process the data using the functionality of the database application 162 per the instructions of the client device 170. The database application 162 is the software component that originates and submits queries to the database management system 120 in accordance with instructions entered by the client device 170. Developers of database applications 162 commonly create frameworks or templates for queries that client devices 170 invoke when making choices within a database application 162. The database application 162 receives the request from the client device 170 and constructs a query based on the template created by the application developer and instructions or parameters supplied by the client device 170. The database management system 120 receives the query from the database application 162 and uses the query instructions to access the database 150. In many cases, the database management system 120 and the database application 162 have been created by separate parties. The system 100 promotes the database management system 120 enforcing constraints on the database application 162 in furnishing queries by requiring the use of the where clause in a plurality of ways depending on the nature of the query, the data tables being accessed by the query, and the client device 170 that furnishes the query. As noted, the client device 170 using the database application 162 is often not specifically building or modifying queries through the database application 162 but is instead invoking queries by clicking on buttons and making other choices from a graphical user interface of the database application 162. In embodiments, the party in control of the client device 170 using the database application 162 may be unaware that database queries are being generated and submitted and in some embodiments the party may have no knowledge that the database application 162 is drawing from the database 150 at all.

In an embodiment, the database application 162 and database management system 120 may reside on the same physical computer, in which case the database management server 110 and the database application server 160 are not separate devices. Some vendors of software may develop both database management systems 120 and database applications 162 in which case it may be practical that the database management system 120 and the database application 162 may share some common files and may call on some of the same software functionality in their operations. Regardless of any sharing or other cooperative arrangement between the two components, the database management system 120 and the database application 162 still perform their separate and distinct functions in the system 100.

The client device 170 is a device with the capacity to access the database application 162 on the database application server 160 using the network 180, furnish queries, and otherwise seek information from the database 150. The client device 170 may be installed with proprietary client software used exclusively to work with the database application 162. In an embodiment, the client device 170 may bypass the database application 162 and make direct contact through the network 180 with the database management system 120. In such an embodiment, the user of the client device 170 may be creating custom queries for processing by the database management system 120. The query limiter subcomponent 132 of the parser component 130 would subject queries received directly from a client device 170 to the same processing steps given to queries received from a database application 162. The client device 170 may be one of a laptop computer, tablet computer, desktop computer, mobile phone, personal digital assistant (PDA), and media player.

The network 180 promotes communication between the components of the system 100. The network 180 may be any communication network including a public data network (PDN), a public switched telephone network (PSTN), a private network, and/or a combination thereof.

Figure 2:
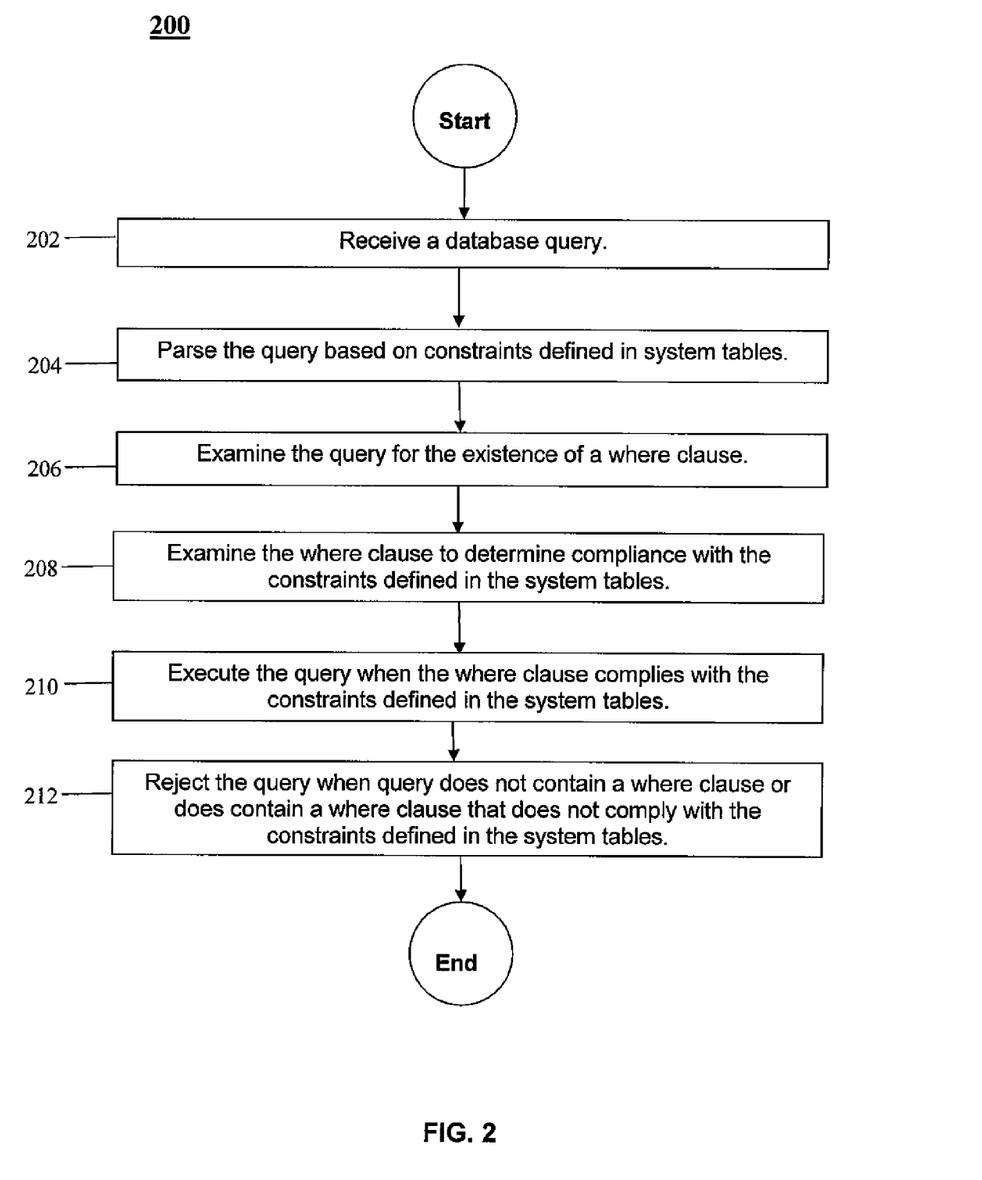
FIG. 2 is a flow chart illustrating a method according to an embodiment of the disclosure.

Turning to FIG. 2, a method 200 of enforcing database predicate constraints on database accesses is provided. In embodiments, accesses to databases 150 may be made using a structured query language (SQL). The query operation is used in structured query languages to retrieve data based on specific criteria. Beginning at block 202, the parser component 130 of the database management system 120 receives a database query. The query may have been submitted by database application 162 on behalf of a client device 170. The client device 170 may have made a choice in a graphical user interface of a database application 162 that causes a query to be automatically generated by the database application 162 and submitted to the database management system 120. When the database application 162 generates the query, the client device 170 using the application may be unable to enter parameters such as a where clause, may be clicking on an icon or a button, and may even be unaware that a database 150 is being accessed. The parameters of the query invoked by the client device 170 may instead have been dictated previously by the developer of the application. The client device 170 may also make choices that cause the application to build the query in a certain way. By requiring the use of the where clause, the database management system 120 may influence the developer to construct guidelines for queries such that a client device 170 may be unable to enter parameters that greatly tax the resources of the database 150 or generate an error. In an embodiment, the client device 170 may create a query without the involvement of a database application 162 and submit the query directly to the database management system 120. At block 202, the query is received by the parser component 130 of the database management system 120.

At block 204, the parser component 130 reads the query and verifies that it is syntactically correct. The parser component 130 checks the query for proper use of operators, case, and grammar. The parser component 130 consults data table constraints table 142 and the user constraints table 144 for constraints specific to the data tables named in the query and constraints on the client device 170 that submitted the query. At block 204, the parser component 130 determines that the query is syntactically acceptable and locates constraints that apply to the data tables involved and to the client device 170.

At block 206, the parser component 130 examines the query for the correct placement of the where clause. The parser component 130 may reject the query if the where clause is not included in the query. The query may be rejected if the where clause is included but is syntactically incorrect. The client device 170 that submits a query without a where clause or invokes an instruction through a database application 162 that does not generate a where clause may receive an error message with advice for resolving the error.

At block 208, assuming the query includes a properly placed where clause and the query is otherwise syntactically acceptable, the query limiter subcomponent 132 specifically analyzes the query and the where clause in light of limitations both specified by the query and required by the constraints found at block 204. The query limiter subcomponent 132 combines the constraints specified in the data table constraints table 142 and the user constraints table 144 and determines whether or not the query and where clause as submitted are acceptable given the constraints. The two constraints tables may contain specific requirements on how the where clause needs to be constructed to effectively limit the scope of the query and thereby protect the database 150 while producing a useful result for the user. In an embodiment, the user constraints table 144 may contain no constraints for certain types of client devices 170. For each of the many different kinds of queries that may be submitted involving data tables, the data table constraints table 142 will provide instructions for how the where clause should be constructed including syntactical structure, parameters that need to be included, and length of query. Whereas previously the database management system 120 would rely on developers of database applications 162 to know how to properly construct queries and thereby be at the mercy of inexperienced or irresponsible developers, the system 100 may reduce those risks by enforcing the use of the where clause limitations to protect the database 150. If the construction of the query and the where clause does not meet the requirements of the data table constraints table 142 and the user constraints table 144, an error message may be provided to the user with advice to alter the query.

At block 210, only when the database management system 120 determines that the structure, parameters, and length of the where clause comply with the constraints in the data table constraints table 142 and the user constraints table 144 and the query is otherwise acceptable, the query is executed. Data cells may begin being accessed by the query. Until this point, the query has not been permitted to access data in the database 150. The system insulates the database 150 from the query until the database management system 120 determines that the query and associated where clause meet requirements of the data table constraints table 142 and the user constraints table 144 for constraints and other limitations. The system subjects the query to parsing and review of where clause one time, prior to the execution of the query. Once the query begins running, the system does not interfere with the operation of the query. At block 212, the query is rejected if the query does not contain a where clause or the query does contain a where clause but it does not comply with the constraints defined in the system table.

Figure 3:
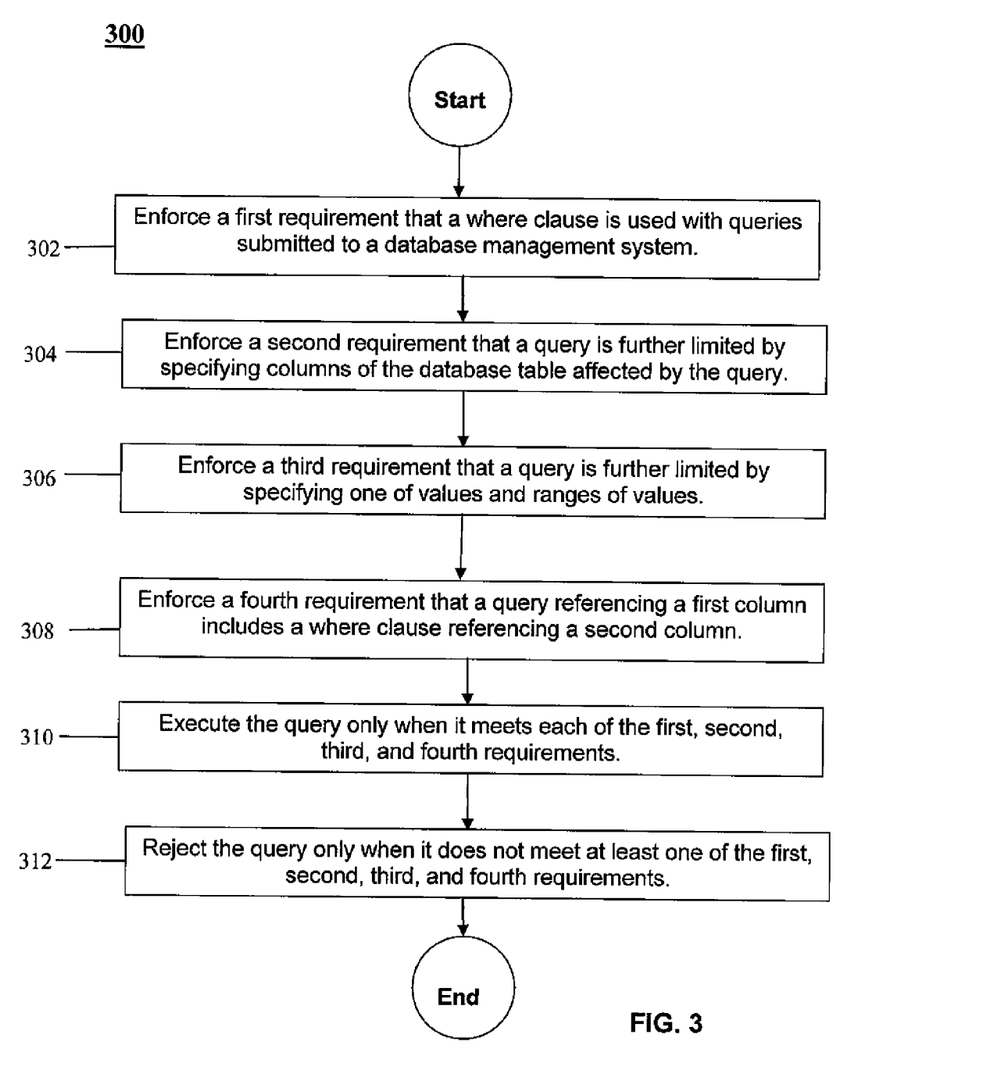
FIG. 3 is a flow chart illustrating another method according to an embodiment of the disclosure.

Turning now to FIG. 3, a method 300 of modifying database commands that use the structured query language to require the use of the where clause is provided. Beginning at block 302, the system enforces a first requirement that database queries include a properly constructed where clause to protect the database 150 from queries that may endanger data quality or consume excessive database 150 resources. Depending on the type of query received, certain criteria and rules will be applied in the process of parsing and examining the query. The criteria and rules for the system are specified in the data table constraints table 142 and the user constraints table 144 along with other constraints enforced by the database management system 120. The data table constraints table 142 and the user constraints table 144 are extensions of the constraints mechanism already built into the database management system 120. At block 302, it is determined whether or not the where clause is properly included with the database query received. An error message or other advice is passed back through the database application 162 if the where clause is not properly included.

At block 304, the system enforces a second requirement that a query is limited by specifying in the where clause the columns of the data tables affected by the query. Requiring table columns to be specified protects the database 150 from destructive and long running queries. A query that does not specifically name and properly order table columns to be queried has the potential to run excessively long, overly tax the processing capacity of the database management system 120 and database 150, and deliver worthless results. The system also enforces the inclusion of certain columns if certain other columns are specified before the where clause. The inclusion of certain dependent columns in a where clause may be mandated by the naming of other columns in the query for the query to execute properly or at all. The system embodies logic to examine the naming and placement of columns in a query string and reject the query if it the columns are logically out of order or incomplete. The correct syntax and inclusion of columns in a query with a where clause may not be enough. The query and where clause should make logical sense and be constructed in a manner that promotes efficient access of database 150 cells. For each data table in the database 150 and type of query involved, the data table constraints table 142 provides constraints that require what the where clause must specify. For example, the mandated inclusion of certain dependent table columns for a given type of query may be a constraint found in the data table constraints table 142 for a certain data table. An additional constraint for the data table may require that the dependent table columns are named in a query in a specific order.

At block 306, the system enforces a third requirement that queries specify values or ranges of values. Queries containing a where clause may call for parameters in which the client device 170 submitting the query is required to enter a value or a range of values. If a query submits values for a parameter that appear not to make sense or if the query altogether omits a parameter that should logically be included in the query, the system may reject the query. When two or more database tables are being combined in a write operation using a type of query called a join query, a where clause that identifies the specific columns of each table that are to be combined in the resulting joined table should be required or the query may be rejected. A join query in a write operation that does not declare the specific columns of the subject tables to be joined may cause a Cartesian product result in which every row from one table is paired with every row from the other table. When tables of more than a few rows each are involved in such an unrestricted join query in a write operation, the result may be a very large quantity of possibly worthless output. When a third or even more tables are joined without join conditions in a where clause, the amount of stress placed on a database 150 by the resulting Cartesian product can cause system failure with the query taking days to complete. Stopping such an unconstrained query in a write operation while it is running and attempting to roll the query back off the database 150 may consume even further resources. Avoiding unnecessary Cartesian product results may be achieved by enforcing the use of join columns when joining multiple tables. This enforcement is achieved by specifying constraints found in the data table constraints table 142 on the data tables involved when the query is requesting a multiple table join. The system also embodies functionality that detects when a multiple table join operation is syntactically and structurally acceptable but not logically correct. It may detect, for example, that when two tables are being joined in an otherwise permissible query, the operation does not make logical sense without joining a third table into the query.

At block 308, the system enforces a fourth requirement that a query referencing a first column must include a where clause that references a second column. This requirement is further concerned with properly limiting the scope of a query to reduce the possibility of a long running or very resource intensive query.

At block 310, when it is determined that a query meets each of the requirements described in blocks 302 through 308, the query is executed. At block 312, if a query does not meet one or more of the requirements described in blocks 302 through 308, the query is rejected and no database cells are accessed.

Figure 4:
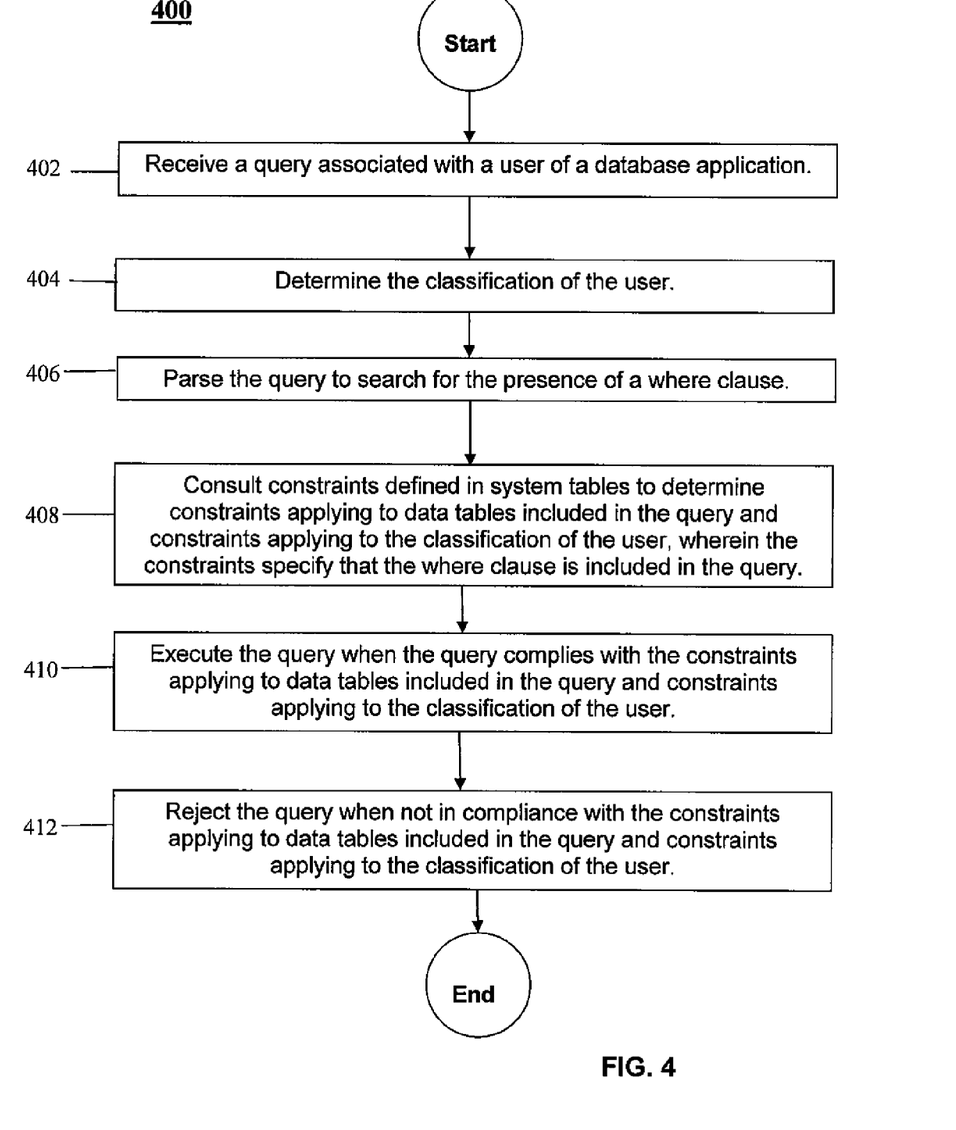
FIG. 4 is a flow chart illustrating another method according to an embodiment of the disclosure.

Turning now to FIG. 4, a method 400 of enforcing constraints on queries of the database 150 is provided. It may be desirable to enforce different levels of constraints on various client devices 170, users, developers of database applications 162, or other parties submitting queries depending on their need for data, the complexity of the proposed query, and the expertise level of the party creating the query. The query and where clause constraints enforced on these components or parties are stored in the user constraints table 144 and are drawn upon by the query limiter subcomponent 132. In a project setting, for example, a team of software developers may be developing an application that uses queries to draw information from data tables stored in a large production database 150. Team members may have different levels of experience and competence in writing queries. It may make sense to provide tight restrictions on the breadth of queries that junior developers may submit while allowing experienced developers much greater leeway in querying the database 150. There may exist situations in which a developer needs to join multiple tables without join conditions. While unusual with large databases 150, a fully intentional Cartesian product may need to be accessible to a very experienced developer who has such a need and understands the risks of launching a query that produces this result. In this example, riskier and more resource-intensive queries may be allowed for senior developers. Junior developers would require approval to depart from normal policy. Constraints associated with users, groups, job functions, and client devices 170 are stored in the user constraints table 144 and are drawn upon for permitting these varied levels of access. All constraints on data tables found in the data table constraints table 142 apply in the method 400 as in all embodiments.

Beginning at block 402, the database management system 120 receives a database query from a database application 162, the query having been furnished to the database application 162 by a client device 170. The client device 170 is in the same role as a software developer in the previous example. At block 404, the classification of the client device 170 and/or associated user is determined by the database management system 120 and the user constraints table 144 is consulted for constraints associated with the client device 170 or user. Varying levels of query constraints may be placed on client devices 170 and users depending on need, authority, expertise, and other factors. Client devices 170 that submit queries containing parameters beyond those permitted by constraints associated with their classification may have their query rejected.

At block 406, the query is examined for syntactical correctness and parsed to search for the presence of a where clause. The parsing includes the examination for column naming, join conditions, and query content described previously. At block 408, the parser component 130 searches the user constraints table 144 for query constraints associated with the client device 170 or user that submitted the query. At block 408, the parser component 130 also extracts constraints on the specific data tables named in the query from the data table constraints table 142. The query limiter subcomponent 132 examines the constraints drawn from both the data table constraints table 142 and the user constraints table 144 in light of what the query and where clause are specifying to determine compliance with those constraints and acceptability of the query. As in the previous methods, in determining if a query may be executed, the database management system 120 takes into account the type of query received, the presence and structure of the where clause included with the query, constraints on the data tables named in the query, and constraints on the client device 170 and/or user that submitted the query. Only when it is determined that the query and where clause meet syntactical and structural requirements as well as comply with constraints associated with the data tables named in the query and constraints associated with the client device 170, the database management system 120 at block 410 executes the query. At block 412, if it is determined that the query is not in compliance with the constraints applying to data tables included in the query and constraints applying to the classification of the user, the query is rejected.

The method 400 is oriented to limiting queries by requiring the use of the where clause and enforcing constraints placed on client devices 170 and other entities or components that submit database queries. While a query received may contain the where clause and all necessary parameters and be otherwise fully acceptable, the particular client device 170 or user may be prohibited due to constraints on the client device 170 from executing the query as constructed and the query will not be executed. In an embodiment, when a user lacks privilege to execute a query, the user may be provided an authorization mechanism associated with privilege permitting execution of the query. The mechanism may require logging at least one of the identity of the user, the query statement executed, the session identifier, the database objects used, constraints overridden, the date of the query, the timestamp associated with the query, the authorization type involved, the password used by the user in executing the query, and the client device identifier associated with the query. In an embodiment, the system may allow a user with a higher permission level, such as a supervisor, to provide approval for the user to submit the query. The supervisor's approval of the query would be recorded. These types of policy overrides may be audited if performance problems arise on a database 150 or network.

While the description of the present disclosure has primarily described technical and performance reasons for enforcing the use of the where clause with queries by placing constraints on data tables and client devices 170, the present disclosure also may be used to promote compliance with business rules and policies. Query constraints that include requiring a where clause may be used to influence behavior that is unrelated to poor query construction. For example, managers of a database management system 120 that make a generic codes table available to client devices 170 may use query constraints including the where clause to enforce that client devices 170 supply a generic code type before they are allowed to retrieve data from the database 150. In another example, two telephone service providers may merge organizations and may consolidate their lists of subscribers into a single master list. Because of the merger there may be duplicate subscriber identifications in the combined master list. Enforcing database query constraints by requiring the use of the where clause to also extract network indicator or account number may reduce the risk of identifying more than one account when querying only on subscriber identification.

Figure 5:
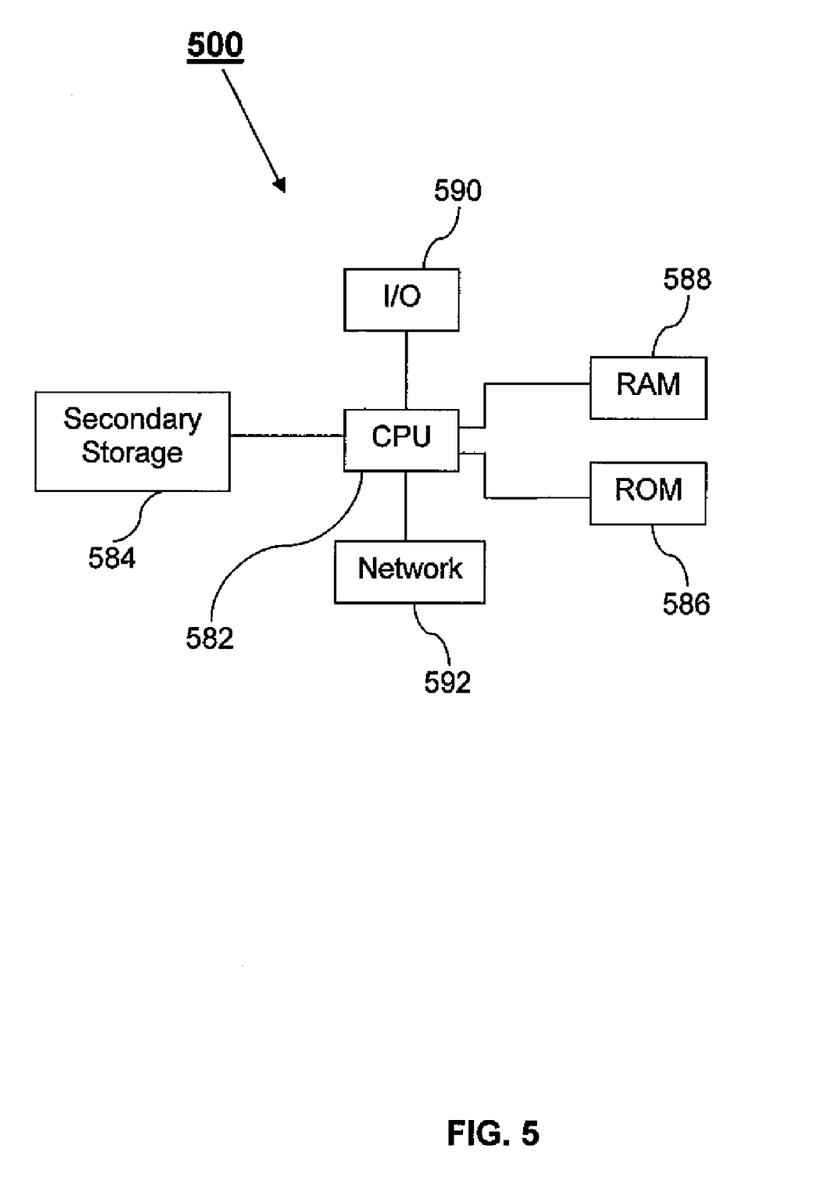
FIG. 5 illustrates an exemplary general purpose computer system suitable for implementing the several embodiments of the disclosure.

Some aspects of the system described above may be implemented on any general-purpose computer with sufficient processing power, memory resources, and network throughput capability to handle the necessary workload placed upon it. FIG. 5 illustrates a typical, general-purpose computer system suitable for implementing one or more embodiments disclosed herein. The computer system 500 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor may be implemented as one or more CPU chips.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage. The RAM 588 is used to store volatile data and perhaps to store instructions. Access to both ROM 586 and RAM 588 is typically faster than to secondary storage 584.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 592 may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592. While only one processor 582 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of enforcing database predicate constraints on database accesses, comprising:
  receiving, by a database management system stored on a non-transitory computer readable medium and executable by a processor, a database query;
  parsing, by the database management system, the query based on query constraints defined in system tables, wherein the query constraints require a where clause in the query and limit the where clause in the query;
  examining, by the database management system, the query for the existence of the where clause;
  examining, by the database management system, the where clause to determine compliance with the query constraints defined in the system tables;
  validating the syntax of the query before executing the query;
  executing, by the database management system, the query only when the query contains the where clause, the where clause complies with the query constraints defined in the system tables, and the query complies with user classification constraints stored in tables of the database management system to apply different levels of access for queries to different user classifications,
  wherein the user classification constraints are applied to client devices; and
  rejecting, by the database management system, the query when the query does not contain the where clause, or when the query does contain the where clause and the where clause does not comply with the query constraints defined in the system tables, or when the query does not comply with the user classification constraints.

2. The method of claim 1, wherein the query is a structure query language (SQL) query.

3. The method of claim 1, wherein the method executes in a database management system.

4. The method of claim 1, further including adding a constraint type to the system tables wherein the constraint type defines the use of the where clause in structured query language statements.

5. The method of claim 1, wherein data cells in a database are not accessed before the query is executed.

6. The method of claim 1, wherein the steps of the method are performed by a parser component of a database management system.

7. The method of claim 6, wherein the steps of the method are performed by a query limiter subcomponent of a parser component of the database management system.

8. A method of modifying database commands using structured query language statements that include a where clause, comprising:
  enforcing, by a database management system stored on a non-transitory computer readable medium and executable by a processor, query constraints on a query submitted to the database management system, wherein the query constraints comprise:
    a first requirement that a where clause is used with the query;
    a second requirement that the where clause in the query specifies columns of the database table affected by the query;
    a third requirement that the query is further limited by specifying one of values and ranges of values; and
    a fourth requirement that when the query references a first column, the where clause identifies a second column;
    a fifth requirement that the query complies with user classification constraints stored in tables of the database management system to apply different levels of access for queries to different user classifications,
    wherein the user classification constraints are applied to client devices;
  validating the syntax of the query before executing the query;
  executing, by the database management system, the query only when the query meets each of the first, second, third, fourth, and fifth requirements of the query constraints; and
  rejecting, by the database management system, the query when the query does not meet at least one of the first, second, third, fourth, and fifth requirements of the query constraints.

9. The method of claim 8, wherein the query constraints are defined in system tables.

10. The method of claim 8, further enforcing the use of the where clause to promote avoidance of an accidental Cartesian product result when multiple tables are joined in the query.

11. The method of claim 10, wherein when multiple tables are joined in the query enforcing that the where clause specifies the join columns.

12. The method of claim 8, wherein data cells in a database are not accessed before the method is completed.

13. A method of enforcing constraints on database accesses, comprising:
  receiving, by a database management system stored on a non-transitory computer readable medium and executable by a processor, a query associated with a user of a database application;
  determining, by the database management system, the classification of the user;
  parsing, by the database management system, the query to search for the presence of a where clause;
  consulting, by the database management system, query constraints defined in system tables to determine query constraints applying to data tables included in the query and user classification constraints defined in tables of the database management system to apply different levels of access for queries to different user classifications, wherein the query constraints applying to data tables included in the query require that the where clause is included in the query and limit the where clause in the query,
  wherein the user classification constraints are applied to client devices;
  validating the syntax of the query before executing the query;
  executing, by the database management system, the query only when the query complies with the query constraints applying to data tables included in the query and the user classification;
  rejecting, by the database management system, the query when the query is not in compliance with at least one of the query constraints applying to data tables included in the query and the user classification constraints.

14. The method of claim 13, wherein different fields within database tables are associated with different user access levels.

15. The method of claim 13, further including defining classifications of users of the database application.

16. The method of claim 13, wherein the user classification constraints are further applied to each individual that submits a query.

17. The method of claim 13, wherein when the user lacks privilege to execute the query, providing the user with an authorization mechanism associated with privilege permitting execution of the query and logging at least one of the identity of the user, the query statement executed, the session identifier, the database objects used, constraints overridden, the date of the query, the timestamp associated with the query, the authorization type involved, the password used by the user in executing the query, and the client device identifier associated with the query.

* * * * *